INVENTOR.
JOHN T. RAUEN
BY
Burton & Parker
ATTORNEYS

Aug. 29, 1967 J. T. RAUEN 3,338,222
CRANKCASE VENTING SYSTEM
Filed March 25, 1965 5 Sheets-Sheet 2

INVENTOR.
JOHN T. RAUEN
BY
Burton & Parker
ATTORNEYS

INVENTOR.
JOHN T. RAUEN
BY
Burton & Parker
ATTORNEYS

Aug. 29, 1967  J. T. RAUEN  3,338,222

CRANKCASE VENTING SYSTEM

Filed March 25, 1965  5 Sheets-Sheet 4

INVENTOR.
JOHN T. RAUEN
BY
Burton E. Parker
ATTORNEYS

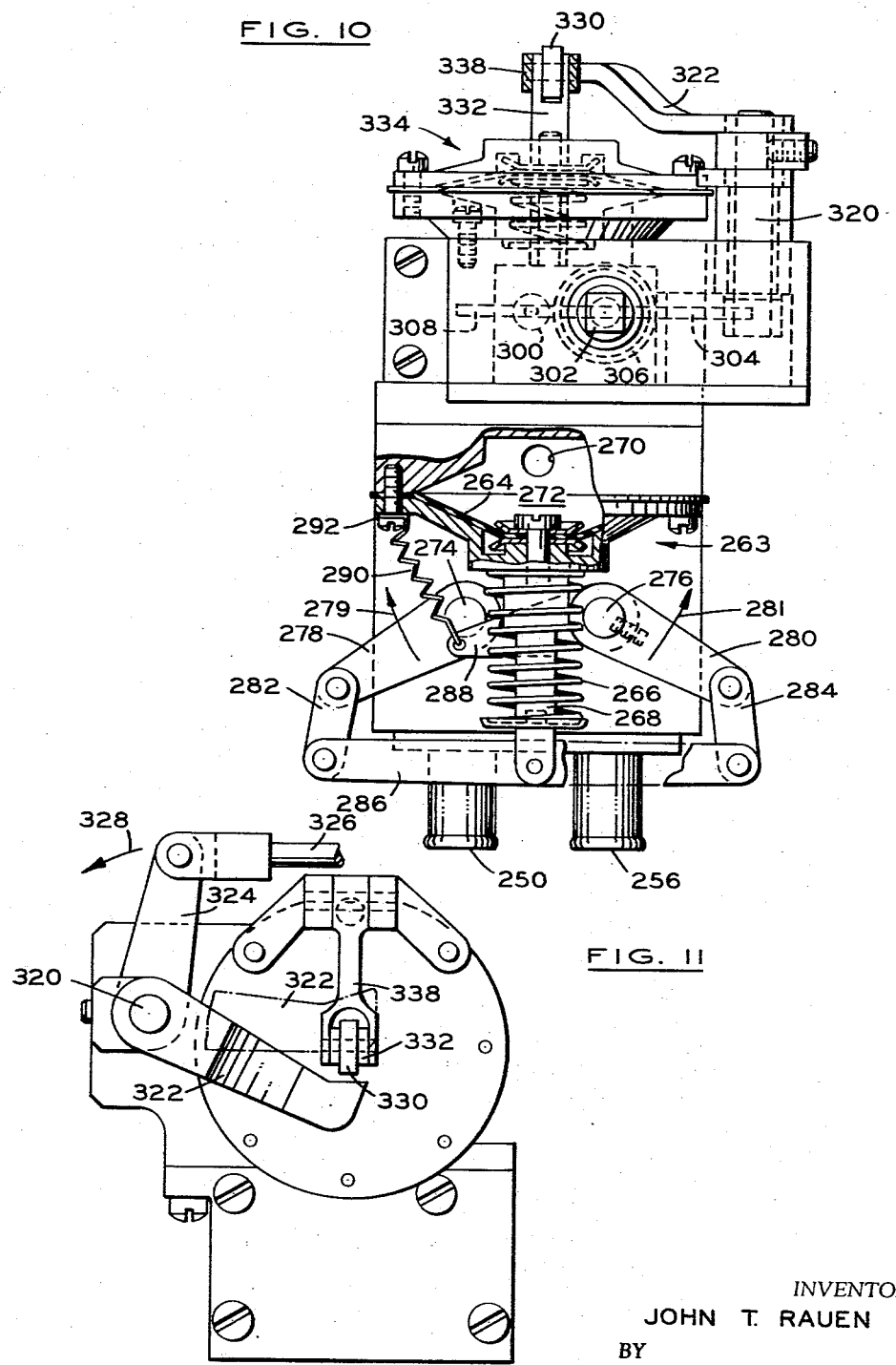

United States Patent Office 3,338,222
Patented Aug. 29, 1967

3,338,222
CRANKCASE VENTING SYSTEM
John T. Rauen, 6190 Lodewyck, Detroit, Mich. 48224
Filed Mar. 25, 1965, Ser. No. 442,631
7 Claims. (Cl. 123—119)

ABSTRACT OF THE DISCLOSURE

Generally, this disclosure relates to a venting system for the crankcase of an internal combustion engine which delivers the crankcase vapors through the induction system for combustion. The system is controlled by a plurality of valves to maintain a vacuum in the engine crankcase.

---

The invention consists of a system having at least two cooperating means. The first means is a fluid conveying passage and control system which conducts vapors from the crankcase, and delivers the vapors through the engine induction system for combustion. The flow is regulated by valves, to maintain a constant vapor flow, and to prevent a flame front originating in the induction system, commonly called a backfire, from reaching the crankcase. The second means regulates the air intake into the induction system, and automatically maintains a predetermined minimum vacuum in the induction system and the crankcase during all engine operating conditions. The two cooperating means of the system are responsive to the absolute pressure in the induction system, independent of the manual operation of the throttle, to prevent the loss of said minimum induction system vacuum.

A controlled secondary venting of the first means may also be provided to control the crankcase vacuum, to prevent an unnecessary loss of crankcase lubricating oil vapors.

Laws have been enacted, and others are under consideration, to combat the problem of air pollution from automotive emission of crankcase vapors. Testing conducted in response to this problem has shown that an engine which maintains a small vacuum in the crankcase, and conveys the crankcase vapors to the induction system under all operating conditions, satisfies these laws. The problem now faced by the automotive industry is to design a relatively simple inexpensive system which accomplishes this result. The invention described below meets this problem. The automotive industry, however, has shown a reluctance to any change in the conventional single throttle carburetor. I have therefore disclosed systems which require only minor carburetor changes, and systems which employ a more advanced dual throttle single barrel carburetor, such as shown in my Patent 2,968,297, issued Jan. 17, 1961.

The primary object of this invention is to maintain a predetermined vacuum in the crankcase of an internal combustion engine under all operating conditions.

Other principal objects of the invention are to provide:

An internal combustion engine crankcase venting system that conducts a predetermined minimum volume of fumes from the engine's crankcase at all engine speeds and independent of the manual throttle open position;

An internal combustion engine crankcase venting system that delivers a predetermined volume of crankcase vapors to the engine's induction system, consisting of a mixture of crankcase fumes and air, independent of the manual throttle open position and at all engine speeds;

An internal combustion engine crankcase venting system that prevents an induction system backfire from causing ignition of fumes in the crankcase;

An internal combustion engine crankcase venting system that conducts a predetermined minimum volume of fumes from the crankcase, while avoiding the drawing off of excessive crankcase lubricating oil vapors;

An internal combustion engine crankcase venting system that isolates the crankcase from the engine induction system during starting to develop the induction system vacuum required for engine starting at extremely low temperatures;

An internal combustion engine crankcase venting system that automatically isolates the crankcase fumes from the induction system when the engine operation is stopped.

An internal combustion engine crankcase venting system having a means for admitting and regulating the volume of air admitted to the crankcase venting system, to the extent of excluding air, while allowing crankcase vapors to be conveyed into the engine induction system;

An internal combustion engine crankcase venting system that is self-cleaning of clogging material;

An internal combustion engine crankcase venting system in which the flow through the venting means is controlled in part by throttle movement;

An internal combustion engine crankcase venting system which prevents congealing or hardening of the crankcase fumes sediment within the vent system.

Other and further objects of the invention will be apparent from the following description and claims and will be understood by reference to the accompanying drawings, of which there are five sheets, which by way of illustration show preferred embodiment and the principles thereof. Other embodiments of the invention embodying the same or equivalent principles may be made as desired by those skilled in the art without departing from the present invention and the purview of the appended claims.

In the drawings:

FIG. 10 is a partial sectional top view of FIG. 8, showing the structure of the valve linkage system; and FIG. 11 is an end view of FIG. 8 in the direction of arrow 11, showing the stop means.

Figure 1:
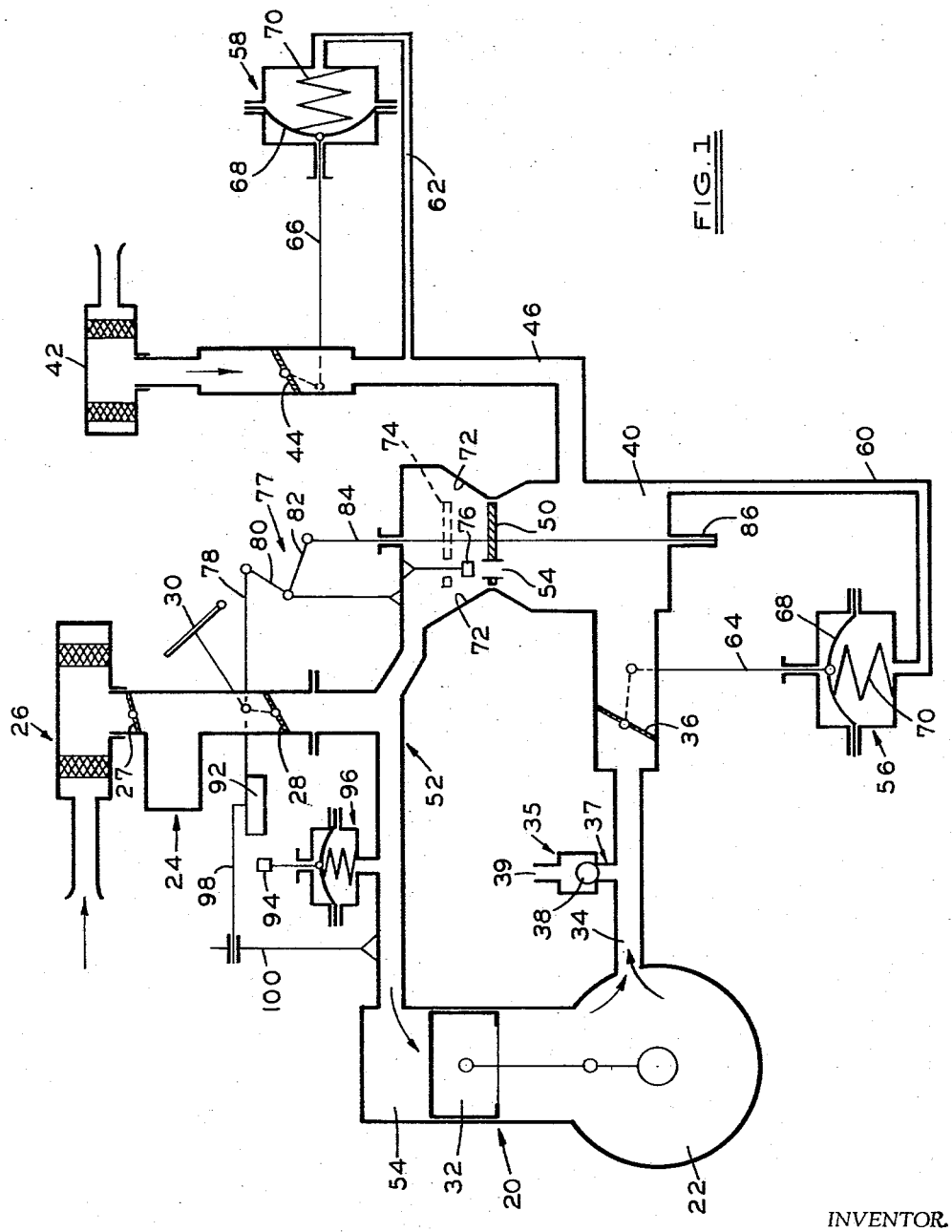
FIG. 1 is a schematic illustration of one embodiment of my invention which does not require a functional carburetor change.

Referring now to FIG. 1, 20 generally indicates an internal combustion engine having a crankcase 22, a carburetor 24, an air cleaner 26, and a conventional choke valve 27. The carburetor 24 is of the conventional type, having a single throttle valve 28 linked to an accelerator or throttle pedal 30.

During engine operation fumes originate in the crankcase 22, which are in part a mixture of hydrocarbon vapors blown past the pistons 32 during engine combustion. The crankcase in this embodiment is sealed, and the fumes formed therein must be allowed to escape. The fumes are generally vented directly to the atmosphere, which is a major cause of air pollution.

In my invention the fumes are vented into the escape passage 34, past the butterfly valve 36, into the mixing chamber 40.

Air is admitted into the mixing chamber 40 through the vent air cleaner 42, past the fluid flow compensating valve 44, through the vent air conduit 46.

The mixture of crankcase fuel vapors and air then flows past the mixing chamber metering valve 50, into the engine induction system, referred to generally as 52, and finally into the combustion chamber 54 where it is burned as fuel.

When the engine is operating at idle, or at partial throttle, the manual throttle valve 28 is only partially open, and a vacuum exists in the induction system 52. This vacuum creates a pressure drop across the manual throttle 28, and across the mixing chamber metering valve 50, due to the relatively small valve flow orifice 54. A lesser vacuum will also be induced in the mixing chamber 40, on the order of one-half inch of mercury vacuum, which is transmitted by the escape passage 34 to the crankcase 22. The pressure differential across the metering valve 50 induces fumes from the crankcase 22, and air through the vent air conduit 46, into the mixing chamber 40.

The flow of gases into the mixing chamber 40 is controlled by the butterfly valves 36 and 44. These valves are made responsive to the absolute pressure in the mixing chamber by the vacuum motors 56 and 58. A vacuum in the mixing chamber 40 is transmitted to the vacuum motors 56 and 58, through the sensor lines 60 and 62 respectively, which draw the valves 36 and 44 open, by retracting arms 64 and 66, respectively.

The vacuum motors illustrated schematically are of a conventional type, which include a flexible diaphragm 68, and a return spring 70. A vacuum in the sensor line draws the flexible diaphragm backward, due to the pressure differential across it, and provided the pressure differential is sufficient to overcome the action of the return spring 70. The spring 70 returns the diaphragm 68 to its original position when the vacuum is removed.

As the manual throttle valve 28 is opened, to increase the engine r.p.m. and power output, the vacuum in the engine induction system 52 decreases, while the volume of fumes in the crankcase 22 increases. This situation is alleviated, and vacuum restored, by increasing the flow through the metering valve, by raising the valve 50 within the mixing chamber's tapered opening 72, to a position shown as 74 in phantom. This provides a greater flow passage, by allowing the fumes to flow around the valve 50. A cleaning device 76, anchored to the upper wall of the mixing chamber, passes through the small orifice 54 as the valve 50 is raised, knocking out sediment which has collected in the orifice. The operation of raising the valve 50 is accomplished by a system of levers operated by the accelerator pedal 30. As the throttle 28 is opened, by depression of the throttle pedal 30, connecting rod 78 and lever 80 of a bell crank, indicated generally as 77, are rotated counterclockwise, as viewed in FIG. 1. This movement lifts bell crank lever 82, which raises valve rod 84 and valve 50. The sealed extension 86 serves as a guide for the metering valve rod 84.

When the engine is started, and the throttle valve 28 remains at least partially closed, a vacuum is induced in the engine's induction system, as explained previously. However, if the throttle valve 28 is now suddenly fully opened, air will flood the induction system 52 and destroy the vacuum. To prevent this needless loss of vacuum I have provided a stop 92, connected to the throttle pedal 30, through lever 78, which engages a corresponding stop 94, responsive to the absolute pressure in the induction system 52. The stop 94 will prevent the full opening of the throttle valve 28 by repression of the throttle pedal 30, until a sufficient vacuum in the induction system 52 is created to actuate the vacuum motor 96, and retract the stop 94. Arm 98, and guide 100, schematically illustrate a guide for the moving stop 92.

When a hot engine is stopped, provision must be made to allow the crankcase vapors to escape, or a pressure will build in the crankcase. In a vented system where the crankcase vapors are vented to the induction system, provision must also be made to prevent the crankcase vapors from rising within the system to deposit the sediment associated with crankcase vapors on the throttle plate, and the carburetor fuel outlets. In this embodiment of my invention, valve 36 will close when the engine is stopped, because the vacuum in the mixing chamber 40 will fall off, and the vacuum motor 56 will close the valve. A ball check valve, generally indicated at 35, will allow the vapors in the crankcase to escape to the atmosphere under these conditions. Vapors will enter the check valve 35 at inlet 37, forcing the ball 38 upward, and escape to the atmosphere through the outlet 39.

The system is cleaned by pouring a few cubic centimeters of gasoline through conduit 46 into the mixing chamber 40, which will submerge the valve 50, forcing the gasoline under air pressure into the crankcase 22 and the induction system 52.

Venting is an intentional fluid leak of crankcase fumes and air into the induction system, because the air portion of the leakage enters the induction system without passing the carburetor. The carburetor is the means of supplying fuel to the engine in a predetermined proportion to the air supplied to the engine. The fumes will not ordinarily be ignited by the heat of the spark produced by the engine's spark plug. The amount of heat in the combustion of fuel within the engine, or the amount of heat in an induction system backfire, is required to ignite these fumes. Therefore, the carburetor is made to flow a slightly excessive quantity of fuel, in proportion to the air entering the carburetor, to provide the proper fuel and air mixture required for ignition within the engine, thereby compensating for the air which enters the induction system through crankcase venting. In this system, when air is excluded from the venting system, and crankcase fumes alone enter the induction system, the normal fuel and air mixture supplied to the engine becomes slightly rich in fuel. However, when the engine is new, and is not being operated at a high enough temperature to produce an appreciable quantity of lubricating oil fumes, the venting to the induction system is primarily air, admitted to the venting system through the fluid volume flow compensating valve 44, which is open to prevent an excessive vacuum in the crankcase 22. When the engine becomes worn, and sufficiently heated, the fluid volume flow compensating valve 44 closes in response to the increased pressure within the mixing chamber 40 caused by the increased volume of blow-by gases and oil fumes, but the crankcase escape valve 36 remains full open. Under these circumstances the fuel mixture provided the engine is too rich, and can cause detrimental engine functioning. At this point the engine requires reconditioning to restore proper functioning. However, the fuel and air mixture in the carburetor may be adjusted to provide a leaner mixture, which can partially restore proper engine functioning.

During engine operation, a flame front or explosion may occur in the engine induction system 52, which is commonly called a backfire. If allowed to reach the sealed crankcase, the backfire would cause ignition of the crankcase fumes, and a serious explosion may result. Under these conditions the pressure in the induction system will suddenly increase, and valve 36 will close, responsive to the pressure change, sealing the crankcase from the induction system.

Figure 2:
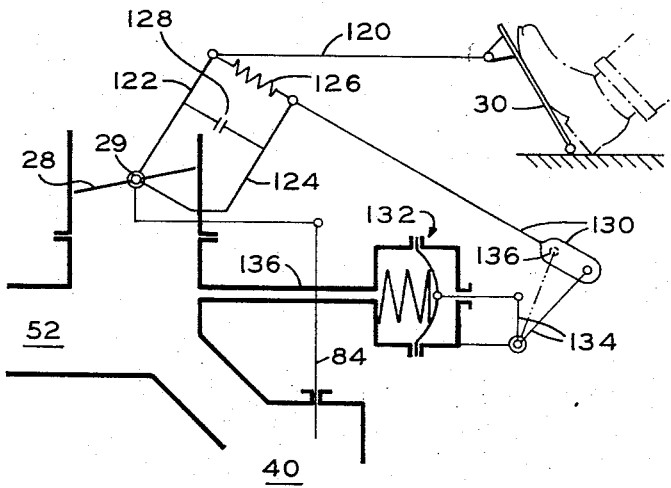
FIG. 2 is a partial schematic illustration of another embodiment of my invention, similar to FIG. 1, except that an alternative throttle control means has been employed.

FIG. 2 is a partial schematic illustration of a modification of FIG. 1, which replaces the accelerator stop 92, with a system that allows total depression of the accelerator for pedal 30, while regulating the throttle valve 28 opening.

The accelerator or throttle pedal 30, is pivotally connected to the throttle shaft 29, by accelerator levers 120 and 122, and is yieldably connected to the throttle lever 124, by the throttle spring 126. The throttle lever 124 directly controls the opening and closing of the throttle 28. A stop 128 is provided between levers 122 and 124, which maintains a predetermined tension in the spring 126. The throttle lever 124 is connected, through a lost motion rod 130, to a vacuum motor 132 by a bell crank lever 134. The vacuum motor is of the type described above, and is made responsive to the absolute pressure in the engine induction system by sensor line 136.

During normal engine operation, when the vacuum in the engine induction system is greater than a predetermined minimum necessary to maintain a corresponding lesser predetermined minimum vacuum in the crankcase, the vacuum motor 132 is retracted, and the bell crank 134 is in the upper position 136, shown in phantom lines. In this position, the throttle valve 28 will respond directly to the action of the throttle pedal 30, because the throttle lever 124 is free to follow the movement of the lever 122. However, when the vacuum in the induction system falls below the predetermined minimum vacuum, as when the throttle pedal 30 is suddenly pushed to the wide open position from engine idle, the vacuum motor 132 will extend the bell crank 134 toward the end of the lost motion rod 130. This exerts a tension force directly on the throttle lever 124, which closes the throttle valve 28 to a position where the predetermined minimum induction system vacuum is maintained.

The metering valve rod 84 is directly connected to the accelerator lever 122, so that the operation of the mixing chamber metering valve, shown as 50 in FIG. 1, is the same as FIG. 1.

The embodiment of FIGS. 1 and 2 are not the only arrangements contemplated to carry out my invention. For example, the air vent system of FIGS. 1 and 2, including the vent air conduit 46, the butterfly valve 44, the vacuum motor 58 and air cleaner 42, could be vented directly into the crackcase 22, instead of the mixing chamber 40, without changing the function or operation of the system. In this modification the vacuum sensor line 62, of the vacuum motor 58, could either be vented directly to the crankcase 22 or connected directly into the vacuum sensor line 60.

Another modification contemplated is to replace the vent air butterfly valve 44 and the corresponding vacuum motor 58, with a metering orifice integral with the air cleaner 42. This modification can be made whether the vent is connected to the mixing chamber 40, or directly to the crankcase 22 as suggested in the previous paragraph.

A further modification contemplated is to provide a by-pass across the vent valve 44, with a ball check valve therein, to allow the escape of fumes and relieve the pressure in the crankcase after a hot engine ceases operation.

Figure 3:
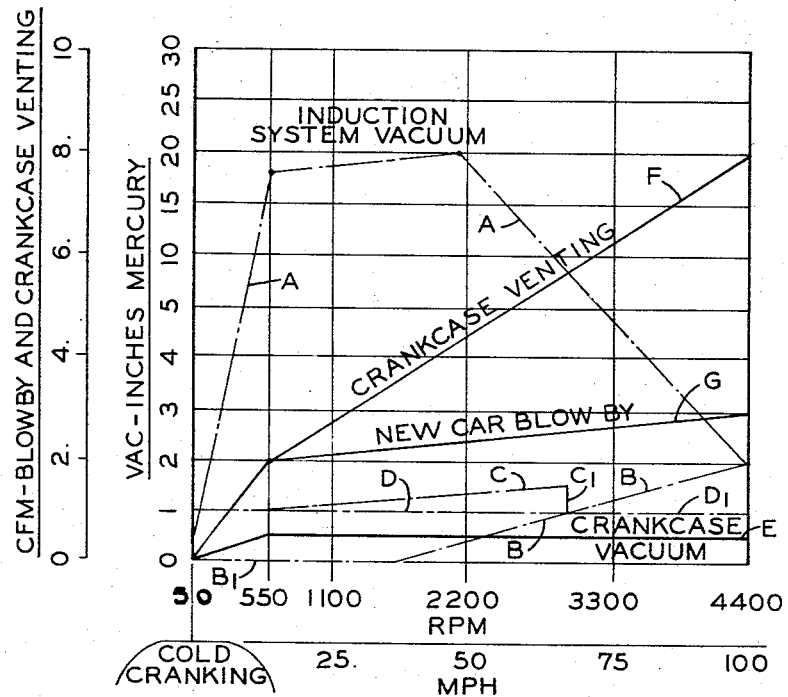
FIG. 3 is a diagrammatic chart showing the engine operating characteristics of my invention.

Referring now to FIG. 3. Curve A represents the induction system vacuum, in inches of mercury vacuum, where the throttle valve is controlled to admit only the required air intake for engine operation. The vacuum increases rapidly to 550 r.p.m. when the throttle is closed to the normal hot engine idle open position, then as power requirements increase, and the throttle is opened further, the vacuum decreases. It is in this stage that the mixing chamber metering valve 50, as seen in FIG. 1, is opened to maintain an adequate flow of crankcase vapors.

Curve B illustrates the induction system vacuum in a conventional internal combustion engine under wide open throttle conditions. It can be seen that no measurable vacuum is created or maintained in the initial $B_1$ portion of the curve, because the volume of air drawn by the engine from the induction system is too small to create a measurable vacuum.

Curve C represents the induction system vacuum under wide open throttle operation of an engine embodying the improvements of my invention, as shown in FIG. 1. A vacuum is created in the induction system, and is maintained during all engine operations. When increased engine speed increases the induction system vacuum sufficiently to retract the stop 94 of FIG. 1, the throttle can then be opened fully, and the induction system drops a small amount, as shown by $C_1$, to the conventional engine vacuum curve B, associated with higher engine speed.

Figure 4:
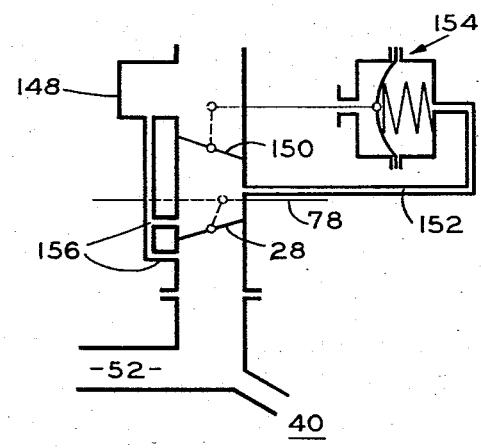
FIG. 4 is a partial schematic illustration of another embodiment of my invention, employing an improved dual throttle carburetor system, in the embodiment of FIG. 1.
Figure 7:
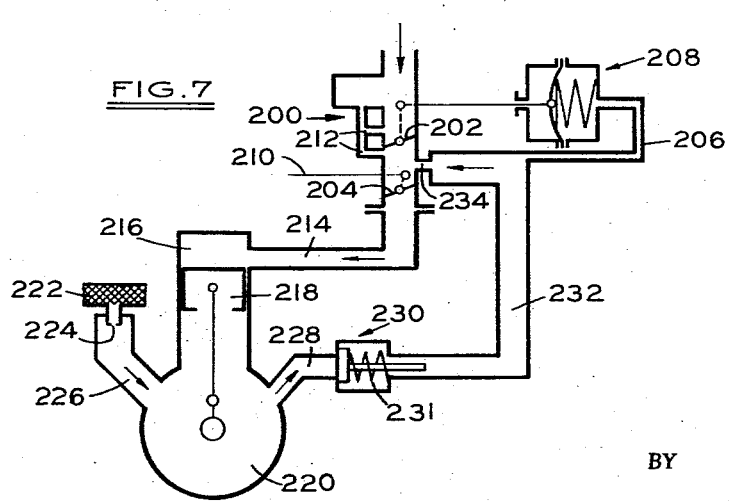
FIG. 7 is a schematic illustration of another embodiment of my invention employing the improved carburetor disclosed in my Patent No. 2,968,297, issued Jan. 17, 1961.

Curve D represents the vacuum in the induction system under wide open throttle conditions of an internal combustion engine embodying the improvements of my invention, as shown in FIG. 2, and FIGS. 4 and 7 which are described below. The embodiment of FIGS. 2 and 4 maintains a constant induction system vacuum until the engine speed reaches the conventional engine wide open throttle curve B, and then the vacuum increases with engine speed along curve B. The embodiment of FIG. 7 maintains a constant induction system vacuum at all engine speeds, as shown by curve $D_1$. There is no drop in vacuum, as there is in curve C at $C_1$, because there is no sudden change in the throttle opening as occurs when the stop 94 of FIG. 1 retracts.

Curves C, D and E illustrate that I have been successful in designing a crankcase venting system that maintains a minimum induction system vacuum, and thereby a minimum crankcase vacuum as shown by curve E, under all engine operations.

Curve F illustrates the crankcase venting, in cubic feet per minute, of FIG. 1, where eight cubic feet per minute is the maximum allowable venting into the induction system without increasing engine lubricating oil consumption in the form of vapors drawn out of the crankcase, as set by the automotive industry. The vented gases may include crankcase vapors and air.

Curve G illustrates the piston blow-by for a new engine. An engine ages, however, the volume of blow-by increases due to engine wear. Thus, it can be seen that vent valve 44 of FIG. 1 compensates for increased piston blow-by to maintain the desired venting, as shown by curve F. As the volume of blow-by increases, thereby tending to decrease the crankcase vacuum, valve 44, responsive to the absolute crankcase pressure, automatically decreases the air intake to maintain a constant crackcase vacuum. When the engine becomes so worn that eight cubic feet per minute of gas is blown by the pistons, the crankcase vacuum will begin to fall off, and the engine must be reconditioned to re-establish a crankcase vacuum.

FIG. 4 represents another modification of FIG. 1, which includes a minimal carburetor functional change. The modification of the carburetor, indicated generally at 148, includes an automatic throttle valve 150, positioned upstream of the manual throttle valve 28. The automatic throttle 150 is made responsive to the absolute pressure in the induction system 52 by the sensor line 152, and the vacuum motor 154. This modification of FIG. 1 eliminates the necessity for the stop system, including stops 92 and 94 of FIG. 1, with the associated control and guide means 96, 98 and 100. The valve 150, now referring to FIG. 4, automatically controls the air intake, to maintain the desired vacuum in the induction system 52, and no stop means is required. When the vacuum in the induction system 52 falls off below the predetermined minimum, the vacuum motor 154 will begin to close the automatic throttle 150, thereby decreasing the air intake, and maintaining the predetermined minimum induction system vacuum. Upon increase in vacuum the valve 150 will reopen. The carburetor fuel outlets 156 are located adjacent the manual throttle 28, as they are in a conventional carburetor.

Figure 5:
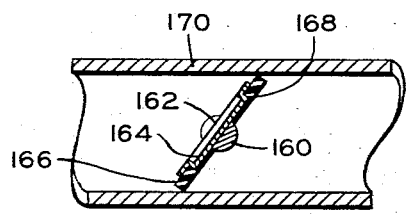
FIG. 5 is an axial sectional view of an improved butterfly valve employed in my invention.

FIG. 5 illustrates a flexible butterfly type valve construction employed in my invention to lessen a normal operating problem associated with the conventional rigid valve construction and operation, such as encountered by valve 36 of FIG. 1. Crankcase fumes are viscous and tend to cling to the valve 36 and its encircling wall of passage 34. The flexible construction of the valve shown in FIGS. 5 and 6 tends to yield and sweep clean the valve and encircling walls each time the valve closes and opens, thereby maintaining the sealing surfaces free of sealing obstructions which tend to prevent full closing and opening of the valve 36.

The valve of this embodiment is carried by a rotatable shaft 160, which is cut away at 162 to receive the valve. The valve itself consists of an elliptical shaped metal blade 164, and an elliptical flexible sealing ring 166 of elastomeric material bonded to the periphery of the blade 164. The metal blade is recessed at 168 to provide a seat for the sealing ring. The flexible sealing ring 168 has a wiping action upon the wall 120 on closing and opening, that improves the seal and compensates for irregularities in the conduit walls 170.

Figure 6:
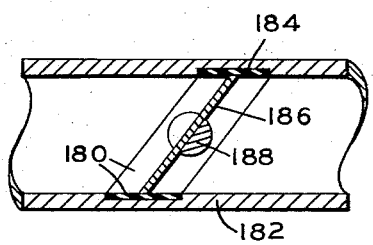
FIG. 6 is another embodiment of an improved butterfly valve.

FIG. 6 illustrates an alternative form of a butterfly valve employing an elastomeric sealing ring. In FIG. 6 the elastomeric sealing ring 180 is bonded within a recess in the passage wall 182 at 184. The rigid valve blade 186 is carried by the rotatable shaft 188, and seats against the sealing ring 180 on closing. This embodiment also has a wiping action on opening and closing, and therefore has the same advantages as the valve construction illustrated in FIG. 5.

FIG. 7 is a schematic illustration of the simplest embodiment of my invention. This embodiment is capable of maintaining a constant predetermined crankcase vacuum, sustained by a constant induction system vacuum and a constant volume of crankcase venting. The system employs an improved dual throttle carburetor, indicated generally at 200, described in my U.S. Patent No. 2,968,297. The carburetor 200 is similar to the carburetor 148, described in reference to FIG. 4, wherein 202 is the automatic throttle valve, 204 is the manual throttle valve, 206 is the venting system sensor, 208 is the vacuum motor which controls the automatic throttle valve 202, and 210 is the throttle pedal connection to the manual throttle 204. However, the carburetor 200 of this embodiment has carburetor fuel outlets 212 adjacent the automatic throttle valve 202, rather than the manual throttle, as shown in FIG. 4. Part of the reason for this modification is because the crankcase vapors are fed directly into the carburetor 200, between the automatic throttle valve 202 and the manual throttle valve 204, where the viscous vapors associated with the crankcase fumes tend to cling to and thereby plug the minute carburetor fuel outlets if these fuel outlets were located downstream of the orifice 234. The action and function of the carburetor in this embodiment, in maintaining a vacuum in the induction system, is identical to the carburetor described in reference to FIG. 4, and will not be repeated here.

Fuel enters the combustion chamber 216 through the induction system 214. During combustion a portion of the fuel will be blown by the pistons 218 into the crankcase 220. Air flows directly into the crankcase 220 from the atmosphere through air cleaner 222, which has a metering orifice 224, and communicates with the crankcase through conduit 226. The mixture of crankcase vapors and vented air are conveyed to the induction system 214 through the escape passage 228, passing the check valve 230 having a spring 231 tending to keep the valve closed, into the main conduit 232, and entering the induction system through the reduced orifice 234, of a smaller area than the air entry orifice 224.

The carburetor 200 is designed to maintain a constant vacuum in the induction system of one inch of mercury, which is transmitted to the main conduit 232, and thereby to the crankcase 220. By proportioning the area of orifices 234 and 224 the one inch mercury vacuum in the induction system at orifice 234 is reduced from one inch vacuum to one-half inch vacuum in the crankcase at orifice 234. It is understood that the compression of the spring 231 in the spring check valve 230 is insufficient to close the valve when fumes are passing from the crankcase, but will close the valve when the engine stops, so that fumes do not rise and clog the automatic throttle 202 and the carburetor fuel outlets 212. The valve 230 also prevents the ignition of vapors in the crankcase 220 during an induction system backfire, by snapping shut when the pressure in the main conduit 232 suddenly increases, as occurs during a backfire.

Vapors in the crankcase 220 originate from three sources; fuel vapors blown by the piston 218, vaporization of condensates in the crankcase itself when the engine temperature increases, and air induced into the crankcase through the metering orifice 224 of the air cleaner 222. The first two of these sources will vary with engine conditions, and the metering orifice 224 is therefore designed to maintain during all engine operations a constant one-half inch of mercury vacuum in the crankcase, and a constant venting of eight cubic feet per minute of crankcase vapors into the induction system 214.

Referring now to FIGS. 8 to 11, which show an embodiment of my invention similar to the embodiment illustrated schematically in FIG. 1, in which I will refer to FIG. 1 to illustrate the function and operation of some of the elements.

Figure 8:
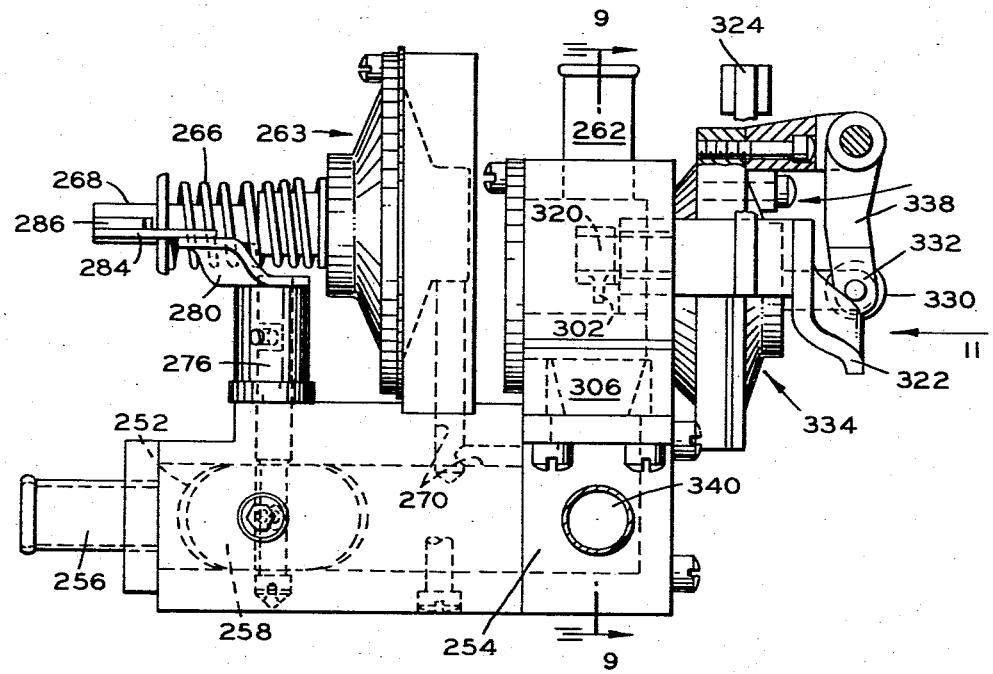
FIG. 8 is a side elevation of another modification of my invention, similar to schematic FIG. 1.
Figure 9:
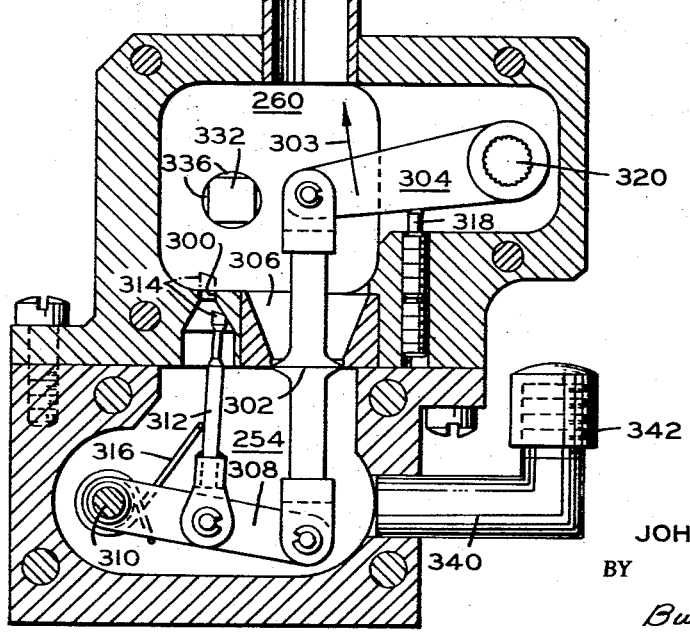
FIG. 9 is a sectional view of FIG. 8, along section line 9—9, showing the mixing chamber and its operation.

Crankcase fumes enter the system through passage 250 shown in FIG. 10, flow past a first butterfly valve 252 shown in FIG. 8, and enter the mixing chamber 254 shown in FIG. 9. In the mixing chamber 254, the crankcase fumes are mixed with air, which enters the system through the passage 256 shown in FIG. 10, flows past the second butterfly valve 258, which is the fluid volume flow compensating valve, shown in FIG. 8, and enters the mixing chamber. The mixture then enters a secondary chamber 260, which is equivalent to the upper portion of the mixing chamber 40 above the valve 50 of FIG. 1, and then passes into the induction system of the engine, as shown in FIG. 1, through the exit passage 262 shown in FIG. 9.

The butterfly valves 252 and 258, which regulate the flow of crankcase fumes and air into the mixing chamber 254, are controlled by a single vacuum motor indicated generally at 263. The equivalent valves 36 and 44 of FIG. 1 are shown controlled by two vacuum motors 56 and 58 for clarity only. The vacuum motor 263 is of the same construction as the motors illustrated schematically in FIG. 1, and consists of a flexible diaphragm 264, a return spring 266, and a piston rod 268, best shown in FIG. 10. The vacuum motor 263 is made responsive to the absolute pressure in the mixing chamber 254 by the sensor line 270, which connects the vacuum motor chamber 272 with the mixing chamber 254.

The butterfly valves 252 and 258 are mounted on control shafts 274 and 276, respectively, which are rigidly connected to the valve control levers 278 and 280, respectively, shown in FIG. 10. The valve control levers 278 and 280 are pivotally connected to opposite ends of the vacuum motor control lever 286 by pivot links 282 and 284, respectively, and the vacuum motor control lever 286 is pivotally connected at its center to the piston rod 268.

The lever 280 has an extension lever 288 formed integral therewith, and is connected to the vacuum motor 263 at 292 by a control spring 290.

FIG. 10 shows the vacuum motor 263 at the zero-vacuum position, with the flexible diaphragm 264 held flush against body wall by action of the return spring 266, and the piston rod 268 fully extended. As a vacuum is induced in the mixing chamber 254, it is transmitted through the sensor line 270 to the vacuum motor 262. The vacuum in the vacuum motor chamber 272 then begins to retract the diaphragm 264, which retracts the piston rod 268. This action tends to pivot the valve control levers 278 and 280 in the direction of the arrows 279 and 281, respectively, which opens the butterfly valves 252 and 258, respectively. However, the valve control lever 288, and the spring 290, will initially prevent motion of the valve lever 280, until the lever 278 has fully opened the valve 252. Immediately thereafter the lever 280 will be moved to fully open the valve 258. Thus, the crankcase fume passage valve 252 will open first, and the fluid volume flow compensating valve 258 will close first. A small reduction of mixing chamber vacuum allows spring 266 to fully close valve 258 while allowing valve 252 to remain fully opened.

A valve system, shown in FIG. 9, is provided between the mixing chamber 254 and the secondary chamber 260, which is equivalent in function to the mixing chamber metering valve 50 of FIG. 1. The mixing chamber 254 is in direct communication with the crankcase, and is therefore at the same absolute pressure. Conversely, the second chamber 260 is in direct communication with the engine induction system, and is at the same absolute pressure as the induction system. This is clearly shown in FIG. 1. A pressure differential is maintained between the mixing chamber 254 and the induction system, as described in connection with valve 50 of FIG 1, to draw crankcase fumes into the induction system.

FIG. 9 shows this valve system at the closed throttle position, wherein all the crankcase fumes and air are induced through the minor orifice 300, which is equivalent to the metering orifice 54 of FIG. 1. As the carburetor throttle is opened, the metering valve 302 is raised by the metering valve lever 304, which allows the vented mixture to flow around the valve, through the tapered major orifice 306. This provides the larger flow path required at increased engine rpm. The lower end of the metering valve is pivotally connected to another lever 308, which is pivotally attached to the wall of the mixing chamber at 310. A cleaning member 312, which is functionally equivalent to the fixed cleaning device 76 of FIG. 1, is pivotally attached to the center of the lever 308, so that the cleaning head 314 raises with the metering valve 302, through the minor orifice 300, to clean the small orifice of accumulated condensate. A spring 316 forces the cleaning head 314 against the tapered walls of the minor orifice 314. The end of the cleaning head 314 is tapered, relative to the axis of the cleaning member 312, for two reasons; to permit rapid movement of the head 314 through the minor orifice 300, and to provide a shaving of accumulated sediment in the minor orifice 300. The movement of the cleaning member head 314 through the minor orifice maintains a predetermined minimum flow orifice, equal to, or smaller than, the cross-sectional area of the orifice 300.

A stop 318, shown in FIG. 9, is provided to prevent overtravel of the metering valve lever 304.

The valve lever 304 is rigidly attached to the inner end of a pivot shaft 320. The outer end of the pivot shaft has two rigidly attached levers, as shown in FIG. 11, a stop lever 322, at the extreme outer end, and a second lever 324. The second lever 324 is pivotally attached to a connecting rod 326, which is actuated by a throttle pedal, through a bell crank which is shown schematically as 77 in FIG. 1. Thus, as the carburetor throttle valve is opened, the pivot shaft 326, and the lever 324, rotate in the direction of the arrow 328, which turns the shaft 320 to lift the metering valve lever 304 and valve 302, as shown by the arrow 303 of FIG. 9.

The stop lever 322 is equivalent to the stop 92 of FIG. 1. A roller stop 330, which is equivalent to the stop 94 of FIG. 1, is mounted on the piston rod 332 of a vacuum motor, indicated generally at 334. The vacuum motor is made responsive to the absolute pressure in the second chamber 260, and thereby the engine induction system, by ports 336, seen in FIG. 9, which surround the vacuum motor piston rod 332. The outer end of the piston rod 332 is pivotally attached to one end of a lever 338, which, at its opposite end is pivotally connected to the upper portion of the vacuum motor body 334, best shown in FIG. 8, to take the thrust of the stop lever 322.

The function of the stop system is the same as described in connection with stops 92 and 94 of FIG. 1. When the engine is at idle, the stop lever 322 is in the position shown in FIG. 11, and the piston rod 332 is fully retracted. If the throttle pedal is then suddenly thrust down, the piston rod 332 will extend and the stop lever 322 will engage the roller stop 330, thereby preventing the full opening of the throttle. The opening of the throttle valve to the stopped position decreases the induction system vacuum to the predetermined minimum. As the engine speed increases the induction system vacuum increases. When the vacuum in the induction system has increased above the predetermined minimum, the vacuum motor 334 will retract the stop 330, and allow the stop lever 322 to pass over the stop 330, as shown in phantom in FIG. 11. The 330 is shown as a rotatable disk, which allows easy passage of the stop lever 322.

A cleaning port 340, provided with an airtight cap 342, is shown in FIG. 9 communicating with the mixing chamber 254. The system can be cleaned, when not in operation, by pouring a few cubic centimeters of gasoline into the port 340, as described in connection with FIG. 1.

The system may also be provided with a fluid jacket, especially in the vicinity of the valves 252 and 258. Any well known temperature control means may be employed. An embodiment of this means could include a partial jacket applied to the bottom portion of the body housing the valves, 252 and 258, and the mixing chamber 254, which is provided with inlet and outlet ports for the temperature control fluid. The jacket could be connected to the engine cooling system for circulation of the cooling fluid through the jacket. In this manner, the area in the vicinity of the valves 252 and 258 will be quickly heated following an extremely low temperature engine start. Also, following stopping of the engine operation, when fully heated, and during extremely high ambient temperatures, the area around the valves 252 and 258 will not be subjected to the extreme temperatures which would harden crankcase sediment. In this manner reliable proper operation is assured during long periods between maintenance service.

While I have illustrated and described preferred embodiments of my invention, it is understood that these are capable of modification, and I therefore do not wish to be limited to the precise details set forth, but desire to avail myself of such changes and alterations as fall within the purview of the following claims.

What is claimed is:

1. An internal combustion engine including an induction system having an air inlet, a crankcase, and means communicating with said induction system and said crankcase for venting crankcase vapors to the induction system, said means including a mixing chamber communicating through a first valve means with the atmosphere, said first valve means responsive to the fluid pressure within said mixing chamber to increase the fluid passage opening with decreasing pressure within the chamber, a second valve means controlling the flow from said chamber to said induction system, said second valve means responsive to conditions in said induction system to increase the fluid passage opening with increasing pressure in said induction system, and a third valve means providing a sealed communication between said crankcase and said mixing chamber until a predetermined minimum vacuum is established in said chamber.

2. The internal combustion engine defined in claim 1, characterized in that said second valve means maintains a predetermined minimum fluid passage opening under all conditions of fluid pressure.

3. The internal combustion engine defined in claim 1, characterized in that said third valve means is responsive to the pressure in said mixing chamber to increase the fluid passage opening upon decrease in fluid pressure in said mixing chamber.

4. The internal combustion engine defined in claim 3, characterized in that said third valve means is operable to seal the crankcase during sudden increases in induction system pressure.

5. The internal combustion engine defined in claim 1, characterized in that said second valve means is controlled by operation of the manual throttle of said induction system, and the fluid passage opening is generally proportional to the opening defined by said manual throttle.

6. The internal combustion engine defined in claim 1, characterized in that a means is provided to limit the intake of air by said induction system by limiting the movement of the manual throttle.

7. The internal combustion engine defined in claim 1, characterized in that the second valve means fluid passage opening is varied in a predetermined relation to the pressure in said induction system.

References Cited

UNITED STATES PATENTS

| | | | |
|---|---|---|---|
| 1,643,753 | 9/1927 | Slattery | 251—306 X |
| 2,166,720 | 7/1939 | Gorleski | 123—119 |
| 2,255,351 | 9/1941 | Dressler | 123—119 |
| 2,516,547 | 7/1950 | Carlson | 123—119 |
| 2,734,525 | 2/1956 | Rausch. | |
| 2,740,423 | 4/1956 | Stillwagon | 251—306 X |
| 2,968,297 | 1/1961 | Rauen | 123—119 |
| 3,051,151 | 8/1962 | Helwig | 123—119 |
| 3,092,091 | 6/1963 | Bosley | 123—119 |
| 3,139,080 | 6/1964 | McMahon | 123—119 |
| 3,166,061 | 1/1965 | Weiser | 123—119 |
| 3,173,408 | 3/1965 | Brenneman | 123—119 |

CARLTON R. CROYLE, *Primary Examiner.*

AL LAWRENCE SMITH, *Examiner.*